US008886191B2

(12) United States Patent
Wang et al.

(10) Patent No.: US 8,886,191 B2
(45) Date of Patent: *Nov. 11, 2014

(54) METHODS AND SYSTEM FOR PERFORMING HANDOVER IN A WIRELESS COMMUNICATION SYSTEM

(75) Inventors: Jin Wang, Central Islip, NY (US); Arty Chandra, Manhasset Hills, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,072

(22) Filed: Jan. 26, 2012

(65) Prior Publication Data

US 2013/0023269 A1   Jan. 24, 2013

Related U.S. Application Data

(63) Continuation of application No. 11/765,013, filed on Jun. 19, 2007, now Pat. No. 8,131,295.

(60) Provisional application No. 60/815,023, filed on Jun. 20, 2006.

(51) Int. Cl.
*H04W 36/00* (2009.01)
*H04W 56/00* (2009.01)
*H04W 92/20* (2009.01)

(52) U.S. Cl.
CPC ............ *H04W 36/00* (2013.01); *H04W 56/001* (2013.01); *H04W 92/20* (2013.01); *H04W 36/0055* (2013.01)
USPC ........... 455/436; 455/434; 455/431; 455/423; 370/335

(58) Field of Classification Search
None
See application file for complete search history.

(56) References Cited

U.S. PATENT DOCUMENTS

| 5,872,774 | A | 2/1999 | Wheatley, III et al. |
| 7,003,303 | B2 | 2/2006 | Khawand et al. |

(Continued)

FOREIGN PATENT DOCUMENTS

| CN | 1612635 A | 5/2005 |
| CN | 1984452 A | 6/2007 |

(Continued)

OTHER PUBLICATIONS

3rd Generation Partnership Project (3GPP), R2-052787, "Channels for Random Access ", CATT, 3GPP TSG RAN WG2 Meeting #49, Seoul, South Korea, Nov. 7-11, 2005, 2 pages.

(Continued)

*Primary Examiner* — Shahriar Behnamian
(74) *Attorney, Agent, or Firm* — Condo Roccia Koptiw LLP

(57) ABSTRACT

A method and system for performing handover in a third generation (3G) long term evolution (LTE) system are disclosed. A source evolved Node-B (eNode-B) makes a handover decision based on measurements and sends a handover request to a target eNode-B. The target eNode-B sends a handover response to the source eNode-B indicating that a handover should commence. The source eNode-B then sends a handover command to a wireless transmit/receive unit (WTRU). The handover command includes at least one of reconfiguration information, information regarding timing adjustment, relative timing difference between the source eNode-B and the target eNode-B, information regarding an initial scheduling procedure at the target eNode-B, and measurement information for the target eNode-B. The WTRU then accesses the target eNode-B and exchanges layer 1/2 signaling to perform downlink synchronization, timing adjustment, and uplink and downlink resource assignment based on information included in the handover command.

20 Claims, 2 Drawing Sheets

(56) References Cited

U.S. PATENT DOCUMENTS

| | | | |
|---|---|---|---|
| 7,525,941 | B2 | 4/2009 | Islam et al. |
| 7,852,805 | B2 | 12/2010 | Kahtava et al. |
| 8,131,295 | B2* | 3/2012 | Wang et al. ............ 455/436 |
| 2003/0016698 | A1 | 1/2003 | Chang et al. |
| 2003/0153275 | A1 | 8/2003 | Oh et al. |
| 2004/0082356 | A1 | 4/2004 | Walton et al. |
| 2004/0170179 | A1 | 9/2004 | Johansson et al. |
| 2004/0174845 | A1 | 9/2004 | Koo et al. |
| 2004/0185853 | A1 | 9/2004 | Kim et al. |
| 2004/0192320 | A1 | 9/2004 | Khawand et al. |
| 2004/0208160 | A1* | 10/2004 | Petrovic et al. ............ 370/350 |
| 2005/0094600 | A1 | 5/2005 | Zhang et al. |
| 2005/0096050 | A1 | 5/2005 | Hidaka |
| 2005/0282549 | A1 | 12/2005 | Kim et al. |
| 2006/0183429 | A1* | 8/2006 | Anderson ............ 455/67.13 |
| 2006/0209798 | A1* | 9/2006 | Oikarinen et al. ............ 370/352 |
| 2006/0223532 | A1 | 10/2006 | Liu et al. |
| 2007/0047493 | A1 | 3/2007 | Park et al. |
| 2008/0227453 | A1 | 9/2008 | Somasundaram et al. |
| 2008/0232304 | A1 | 9/2008 | Mooney et al. |
| 2008/0242292 | A1 | 10/2008 | Koskela et al. |
| 2008/0254800 | A1 | 10/2008 | Chun et al. |
| 2008/0261600 | A1 | 10/2008 | Somasundaram et al. |
| 2008/0267131 | A1 | 10/2008 | Kangude et al. |
| 2008/0285539 | A1 | 11/2008 | Tiedemann, Jr. et al. |
| 2009/0086676 | A1 | 4/2009 | Meylan et al. |
| 2009/0129335 | A1 | 5/2009 | Lee et al. |
| 2009/0168728 | A1 | 7/2009 | Pani et al. |
| 2009/0238141 | A1 | 9/2009 | Damnjanovic et al. |
| 2009/0239539 | A1 | 9/2009 | Zhang et al. |
| 2009/0247161 | A1 | 10/2009 | Pani et al. |
| 2009/0274086 | A1 | 11/2009 | Petrovic et al. |
| 2009/0309921 | A1 | 12/2009 | Ohyama et al. |
| 2010/0027466 | A1 | 2/2010 | Mustapha |
| 2010/0113033 | A1* | 5/2010 | Qiu et al. ............ 455/438 |
| 2010/0182974 | A1 | 7/2010 | Barraclough et al. |
| 2010/0202402 | A1 | 8/2010 | Dalsgaard et al. |
| 2010/0210255 | A1 | 8/2010 | Amirijoo et al. |
| 2010/0238799 | A1 | 9/2010 | Sebire |
| 2010/0279695 | A1* | 11/2010 | Amirijoo et al. ............ 455/438 |

FOREIGN PATENT DOCUMENTS

| | | |
|---|---|---|
| CN | 101069448 A | 11/2007 |
| EP | 0568212 B1 | 9/1997 |
| EP | 1058417 A2 | 12/2000 |
| EP | 1058471 A2 | 12/2000 |
| EP | 1117269 A1 | 7/2001 |
| EP | 1199904 A1 | 4/2002 |
| EP | 1408658 A2 | 4/2004 |
| EP | 1799003 A1 | 6/2007 |
| EP | 1909520 A1 | 4/2008 |
| EP | 1909523 A1 | 4/2008 |
| GB | 2353671 A | 2/2001 |
| IL | 194081 | 6/2009 |
| JP | 10023501 A | 1/1998 |
| JP | 2006-504335 A | 2/2006 |
| JP | 2006-515484 A | 5/2006 |
| JP | 2009-509431 A | 3/2009 |
| JP | 2009-519636 A | 5/2009 |
| JP | 2010-23501 A | 2/2010 |
| JP | 2010-506445 A | 2/2010 |
| JP | 5023150 B2 | 9/2012 |
| KR | 10-2005-0116497 A | 12/2005 |
| RU | 2003122285 A | 2/2005 |
| RU | 2292669 C2 | 1/2007 |
| RU | 2305900 C2 | 9/2007 |
| TW | M340666 U | 9/2008 |
| WO | WO 01/72081 A1 | 9/2001 |
| WO | WO 01/76304 A1 | 10/2001 |
| WO | WO 03/043237 A1 | 5/2003 |
| WO | WO 2004/079948 A1 | 9/2004 |
| WO | WO 2004/080102 A1 | 9/2004 |
| WO | WO 2005/006596 A1 | 1/2005 |
| WO | WO 2005/020617 A1 | 3/2005 |
| WO | WO 2005/032199 A1 | 4/2005 |
| WO | WO 2005/120183 A2 | 12/2005 |
| WO | WO 2005/122704 A2 | 12/2005 |
| WO | WO 2006/061671 A1 | 6/2006 |
| WO | WO 2006/073225 A2 | 7/2006 |
| WO | WO 2007/038994 A2 | 4/2007 |
| WO | WO 2007/066882 A1 | 6/2007 |
| WO | WO 2007/068304 A1 | 6/2007 |
| WO | WO 2007/108959 A1 | 9/2007 |
| WO | WO 2007/144760 A2 | 12/2007 |
| WO | WO 2007/149509 A2 | 12/2007 |
| WO | WO 2008/023927 A2 | 2/2008 |
| WO | WO 2008/040447 A1 | 4/2008 |

OTHER PUBLICATIONS

3rd Generation Partnership Project (3GPP), R2-060821, "RACH Message Structure", Nokia, Joint 3GPP TSG-RAN WG1 & WG2 Meeting on LTE, Athens, Greece, Mar. 27-31, 2006, 2 pages.

3rd Generation Partnership Project (3GPP), TS 25.331 V6.7.0, "Technical Specification Group Radio Access Network, Radio Resource Control (RRC), Protocol Specification (Release 6)", Sep. 2005, 1-1166.

3rd Generation Partnership Project (3GPP), TS 25.331 V6.9.0, "Technical Specification Group Radio Access Network, Radio Resource Control (RRC), Protocol Specification (Release 6)", Mar. 2006, 1-1209.

3rd Generation Partnership Project (3GPP), R1-060773, "Text Proposal of Prioritizing Non-synchronized Random Access in E-UTRA uplink," ITRI, 3GPP TSG-RAN WG1 Meeting #44bis, R1-060773, Athens, Greece, Mar. 27-31, 2006, 6 pages.

3rd Generation Partnership Project (3GPP), R1-072648, "LS on LTE latency analysis", RAN WG2, 3GPP TSG RAN WG1 Meeting #49bis, Orlando, Florida, Jun. 25-29, 2007, 10 pages.

3rd Generation Partnership Project (3GPP), R2-060078, "Handover procedure for LTE_ACTIVE UEs", Samsung, 3GPP TSG-RAN WG 2, Meeting#50, Sophia-Antipolis, France, Jan. 9-13, 2006, 9 pages.

3rd Generation Partnership Project (3GPP), R2-060095, "Real-time services handover support within E-UTRAN," Huawei, 3GPP TSG-RAN2, Meeting #50, Sophia-Antipolis, France, Jan. 9-13, 2006, 4 pages.

3rd Generation Partnership Project (3GPP), R2-061135, "Intra-LTE Handover operation," Nokia, NTT DoCoMo, 3GPP TSG-RAN WG2 Meeting #53, R2-061135, Shanghai, PRC, May 8-13, 2006, 3 pages.

3rd Generation Partnership Project (3GPP), R2-061199, "Discussion on eNode B Change Procedure", Qualcomm Europe, 3GPP TSG-RAN WG2 Meeting #53, R2-061199, Shanghai, China, May 8-12, 2006, 7 pages.

3rd Generation Partnership Project (3GPP), R2-061928, "RRC Re-establishment Procedure", NTT DoCoMo, 3GPP TSG-RAN WG2 Ad-hoc on LTE, R2-061928, Cannes, France, Jun. 27-30, 2006, 6 pages.

3rd Generation Partnership Project (3GPP), R2-070167, "Neighbouring cell information", Samsung, 3GPP TSG-RAN WG2 Meeting #56bis, Jan. 15-19, 2007, 3 pages.

3rd Generation Partnership Project (3GPP), R2-070646, "Contention-free Intra-LTE handover", IPWireless, 3GPP TSG RAN WG2 #57, Feb. 12-16, 2007, 4 pages.

3rd Generation Partnership Project (3GPP), R2-071229, "Radio Link Failure and Context Recovery", Nokia, 3GPP TSG-RAN WG2 Meeting #57bis, St. Julian's, Malta, Mar. 26-30, 2007, 3 pages.

3rd Generation Partnership Project (3GPP), R2-071359, "Radio Link Failure", Ericsson, 3GPP TSG-RAN WG2 #57bis, St. Julian, Malta, Mar. 26-30, 2007, 4 pages.

3rd Generation Partnership Project (3GPP), R2-073992, "Delivery of HO Command", Qualcomm Europe, 3GPP TSG-RAN WG 2 meeting #59-bis, Oct. 8-12, 2007, 3 pages.

3rd Generation Partnership Project (3GPP), R2-074312, "Need to obtain the target SFN prior to HO", LG Electronics, 3GPP TSG-RAN#59bis WG 2 LTE, Oct. 8-12, 2007, 2 pages.

3rd Generation Partnership Project (3GPP), R2-082903, "Change Request for 3GPP TS 36.331 V8.1.0 (Mar. 2008)", 3GPP TSG-RAN2 Meeting #62, Kansas City, U.S.A., May 5-9, 2008, 177 pages.

(56) References Cited

OTHER PUBLICATIONS

3rd Generation Partnership Project (3GPP), R2-082948, "SIB reading after handover", Panasonic, 3GPP TSG RAN WG2 RRC Ad Hoc, Sophia Antipolis, France, Jun. 5-6, 2008, 4 pages.

3rd Generation Partnership Project (3GPP), R3-060009, "The Handover Procedure for the LTE_ACTIVE Mobility," Panasonic, 3GPP TSG-RAN WG3 Meeting #50, R3-060009, Sophia Antipolis, France, Jan. 10-12, 2006, 4 pages.

3rd Generation Partnership Project (3GPP), TR 25.912 V7.1.0, "3rd Generation Partnership Project (3GPP), Technical Specification Group Radio Access Network"; Feasibility study for evolved Universal Terrestrial Radio Access (UTRA) and Universal Terrestrial Radio Access Network (UTRAN) (Release 7), Sep. 2006, 57 pages.

3rd Generation Partnership Project (3GPP), TS 36.300 V8.4.0, "3rd Generation Partnership Project; Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", Mar. 2008, 126 pages.

3rd Generation Partnership Project (3GPP), TS 36.300 V8.5.0, "3rd Generation Partnership Project (3GPP); Technical Specification Group Radio Access Network; Evolved Universal Terrestrial Radio Access (E-UTRA) and Evolved Universal Terrestrial Radio Access network E-UTRAN); Overall Description; Stage 2 (Release 8)", May 2008, 134 pages.

3rd Generation Partnership Project (3GPP), TS 36.300 V8.9.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Jun. 2009,159 pages.

3rd Generation Partnership Project (3GPP), TS 36.300 V9.0.0, "3rd Generation Partnership Project (3GPP); Technical Specification Group Radio Access Network; Evolved Universal Terrestrial Radio Access (E-UTRA) and Evolved Universal Terrestrial Radio Access network (E-UTRAN); Overall Description; Stage 2 (Release 9)", Jun. 2009, 157 pages.

3rd Generation Partnership Project (3GPP), TS 36.331 V8.2.0, "3rd Generation Partnership Project; Technical Specification Group Radio Access Network; Evolved Universal Terrestrial Radio Access (E-UTRA) Radio Resource Control (RCC); Protocol Specification (Release 8)", May 2008, 151 pages.

3rd Generation Partnership Project (3GPP), TS 36.331 V8.4.0, "3rd Generation Partnership Project (3GPP); Technical Specification Group Radio Access Network; Evolved Universal Terrestrial Radio Access (E-UTRA) Radio Resource Control (RRC); Protocol Specification (Release 8)", Dec. 2008, 198 pages.

3rd Generation Partnership Project (3GPP); TR 25.912 V0.1.4, "3rd Generation Partnership Project; Technical Specification Group Radio Access Network; Feasibility Study for Evolved UTRA and UTRAN (Release 7)", May 2006, 38 pages.

3rd Generation Partnership Project (3GPP); TR 25.912 V0.1.7, "3rd Generation Partnership Project; Technical Specification Group Radio Access Network, Feasibility Study for Evolved UTRA and UTRAN (Release 7)", Jun. 2006, 64 pages.

3rd Generation Partnership Project (3GPP); TR 25.912 V0.2.0, "3rd Generation Partnership Project; Technical Specification Group Radio Access Network; Feasibility Study for Evolved UTRA and UTRAN (Release 7)", Jun. 2006, 57 pages.

3rd Generation Partnership Project (3GPP); TS 25.331 V8.0.0, "3rd Generation Partnership Project; Technical Specification Group Radio Access Network; Radio Resource Control (RRC); Protocol Specification (Release 8)," TS 25.331 V8.0.0, Sep. 2007, 1458 pages.

3rd Generation Partnership Project (3GPP); TS 36.300 V8.8.0, "3rd Generation Partnership Project (3GPP); Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", Mar. 2009, 157 pages.

3rd Generation Partnership Project (3GPP); TS 36.331 V8.6.0, "3rd Generation Partnership Project (3GPP); Technical Specification Group Radio Access Network; Evolved Universal Terrestrial Radio Access (E-UTRA) Radio Resource Control (RRC) (Release 8)", Jun. 2009, 207 pages.

3rd Generation Partnership Project, TS 36.331 V8.1.0, "3rd Generation Partnership Project; Technical Specification Group Radio Access Network; Evolved Universal Terrestrial Radio Access (E-UTRA) Radio Resource Control (RRC); Protocol Specification (Release 8)", Mar. 2008, 122 pages.

3rd Generation Partnership Project, TS 36.331 V8.5.0, "3rd Generation Partnership Project; Technical Specification Group Radio Access Network; Evolved Universal Terrestrial Radio Access (E-UTRA) Radio Resource Control (RRC); Protocol Specification (Release 8)", Mar. 2009, 204 pages.

European Telecommunications Standards Institute (ETSI), TS 136 300 V8.4.0, "Evolved Universal Terrestrial Radio Access (E-UTRA) and Evolved Universal Terrestrial Radio Access network (E-UTRAN); Overall Description; Stage 2 (3GPP TS 36.300 Version 8.4.0 Release 8)", Apr. 2008, 5 pages.

Koodli, et al., "A Context Transfer Protocol for Seamless Mobility", Draft-koodli-seamoby-ct-04.txt, Seamoby Working Group, Internet Draft, Aug. 30, 2002, 35 pages.

3rd Generation Partnership Project (3GPP), TS 36.300, V8.0.0, "3rd Generation Partnership Project; Technical Specification Group Radio Access Network; Evolved Universal Terrestrial Radio Access (E-UTRA) and Evolved Universal Terrestrial Radio Access network (E-UTRAN); Overall Description; Stage 2, (Release 8)", Mar. 2007, 82 pages.

3rd Generation Partnership Project (3GPP), R2-062809, "Non-contention based handover procedure on RACH channel," ZTE, TSG-RAN Working Group 2 meeting Seoul, Korea, Oct. 9-13, 2006, 4 pages.

3rd Generation Partnership Project (3GPP), Tdoc R2-072193, "LS on LTE Latency Analysis", Release 8, 3GPP TSG-RAN WG2 Meeting #58, Kobe, Japan, May 7-11, 2007,12 pages.

3rd Generation Partnership Project (3GPP), 3GPP TR R3.018 V0.4.0, "$3^{rd}$ Generation Partnership Project; Technical Specification Group Radio Access Network; Evolved UTRA and UTRAN; Radio Access Architecture and Interfaces (Release 7)", May 2006,52 pages.

3rd Generation Partnership Project (3GPP), R2-082982, "Measurement Related Actions During Handover", Huawei, 3GPP TSG RAN WG2—RRC Adhoc, Sophia Antipolis, France, Jun. 5-6, 2008, 4 pages.

* cited by examiner

METHODS AND SYSTEM FOR PERFORMING HANDOVER IN A WIRELESS COMMUNICATION SYSTEM

CROSS REFERENCE TO RELATED APPLICATIONS

This application is a continuation of U.S. patent application Ser. No. 11/765,013, filed Jun. 19, 2007, now U.S. Pat. No. 8,131,295; which claims the benefit of U.S. Provisional Patent Application No. 60/815,023, filed Jun. 20, 2006, the contents of which are hereby incorporated by reference herein.

FIELD OF THE INVENTION

The present invention is related to wireless communication systems. More particularly, the present invention is related to a method and system for performing handover in a long term evolution (LTE) system.

BACKGROUND

LTE for the fourth generation (4G) system is now being considered to develop a new radio interface and radio network architecture that provides a high data rate, low latency, packet optimization, and improved system capacity and coverage. For an LTE system, instead of using code division multiple access (CDMA), which is currently being used in a 3G system, orthogonal frequency division multiple access (OFDMA) and frequency division multiple access (FDMA) are proposed to be used in downlink and uplink transmissions, respectively. By changing in many aspects in the LTE system, intra-LTE handover procedures and related operations need to be re-considered.

The user equipment (UE) mobility management in an LTE_ACTIVE mode handles all necessary steps for seamless handover in the LTE system, such as making an intra-LTE handover decision on a source network side, (i.e., control and evaluation of UE and evolved Node-B (eNode-B) measurements taking into account UE-specific area restrictions), preparing radio resources on a target network side, commanding the UE to interface with new radio resources, releasing radio resources on the source network side, and the like. The UE mobility management mechanism also handles the transfer of context data between involved nodes, and the update of node relations on a control plane (C-plane) and a user plane (U-plane).

FIG. 1 is a signaling diagram of a handover process 100 currently proposed for the LTE system. A UE 152 and a source eNode-B 154 perform measurements and exchange measurement reports (step 102). The source eNode-B 154 makes a handover decision based on the measurement reports (step 104). The source eNode-B 154 then sends a handover request to a target eNode-B 156 (step 106). The handover decision and subsequent procedures before handover completion are performed without involving a mobility management entity/user plane entity (MME/UPE) 158, (i.e., handover preparation messages are directly exchanged between the source eNode-B 154 and the target eNode-B 156).

The target eNode-B 156 performs an admission control for the UE 152 (step 108). If the target eNode-B 156 can accept the UE 152, the target eNode-B 156 sends a handover response to the source eNode-B 154 (step 110). The source eNode-B 154 sends a handover command to the UE 152 (step 112). For seamless handover, a U-plane tunnel is established between the source eNode-B 154 and the target eNode-B 156.

The UE 152 and the target eNode-B 156 then exchange layer 1 and 2 (L1/L2) signaling (step 114). During handover execution, user data may be forwarded from the source eNode-B 154 to the target eNode-B 156. The forwarding may take place in a service dependent and implementation specific way. Forwarding of user data from the source eNode-B 154 to the target eNode-B 156 should take place as long as packets are received at the source eNode-B 154 from the UPE 158.

After a connection to the target eNode-B 156 is established, the UE 152 sends a handover complete message to the target eNode-B 156 (step 116). The target eNode-B 156 sends a handover complete message to the MME/UPE 158 (step 118). The MME/UPE 158 then sends a handover complete acknowledgement (ACK) to the target eNode-B 156 (step 120). After the MME/UPE 158 is informed by the target eNode-B 156 that the UE 152 has gained an access at the target eNode-B 156 by the handover complete message, the U-plane path is switched by the MME/UPE 158 from the source eNode-B 154 to the target eNode-B 156.

The release of the radio resources at the source eNode-B 154 is triggered by a release resource message sent by the target eNode-B 156 (step 122). After receiving the release resource message from the target eNode-B 156, the source eNode-B 154 releases the radio resources for the UE 152 (step 124). The UE 152 performs a location update with the MME/UPE 158 (step 126).

The above intra-LTE handover procedure 100 does not provide details regarding the handover command, (such as configurations of the UE 152 based on the target eNode-B's requirement), and details regarding UE operation after the UE receives the handover command, (such as data transmission between the source eNode-B 154 and the UE 152 and radio link control (RLC) and hybrid automatic repeat request (HARQ) reset and packet data convergence protocol (PDCP) sequence number (SN) gap identification by the UE 152). The above intra-LTE handover procedure 100 also does not provide details regarding UE timing adjustment for synchronous and asynchronous eNode-Bs and details for efficient target eNode-B scheduling of resources for UE transmission.

SUMMARY

A method is provided for recovering from an unsuccessful handover. The method may include a wireless transmit/receive unit (WTRU) determining that a procedure for handover of the WTRU from a source cell to a target cell was unsuccessful. The method may also include the WTRU initiating a radio link failure procedure in response to determining that the procedure for handover was unsuccessful. The WTRU may send an indication of a cell identity (ID) of the source cell with a radio network temporary identifier (RNTI) during the radio link failure procedure. The WTRU may attempt to access at least one cell upon determining that the procedure for handover was unsuccessful. The at least one cell may include the source cell, a second cell being served by the same evolved Node-B (eNode-B) as the source cell, and/or a third cell being served by a different eNode-B than the eNode-B serving the source cell. The third cell may be selected based on a measurement result. The RNTI may be an RNTI for a Long Term Evolution (LTE) system.

An eNode-B may include a transceiver configured to transmit and receive data, and a controller, coupled to the transceiver. The controller may be configured to send a handover command to a WTRU. The handover command may instruct the WTRU to handover over from a source cell served by the eNode-B to a target cell. The controller may be configured to receive an indication of a cell identity (ID) of the source cell with a RNTI during a radio link failure procedure. The controller may be further configured to inform a target eNode-B of an unsuccessful handover of the WTRU from the source cell to a target cell of the target eNode-B. The controller may be further configured to maintain a timer. Expiration of the timer prior to receipt of a handover complete message may indicate a handover failure. The controller may be further configured to reset radio link control (RLC) parameters and hybrid automatic repeat request (HARQ) parameters based on expiration of the timer.

The present invention is related to a method and system for performing handover in an LTE system. A source eNode-B makes a handover decision based on measurements, and sends a handover request to a target eNode-B. The target eNode-B sends a handover response to the source eNode-B indicating that a handover should commence. The source eNode-B then sends a handover command to a wireless transmit/receive unit (WTRU). The handover command includes at least one of reconfiguration information, information regarding timing adjustment, relative timing difference between the source eNode-B and the target eNode-B, information regarding an initial scheduling process at the target eNode-B, and measurement information for the target eNode-B. The WTRU then accesses the target eNode-B and exchanges layer 1/2 signaling to perform downlink synchronization, timing adjustment, and uplink and downlink resource assignment based on information included in the handover command.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a UE, a mobile station, a fixed or mobile subscriber unit, a pager, a cellular telephone, a personal digital assistant (PDA), a computer, or any other type of user device capable of operating in a wireless environment. When referred to hereafter, the terminology "eNode-B" includes but is not limited to a base station, Node-B, a site controller, an access point (AP), or any other type of interfacing device capable of operating in a wireless environment.

The present invention provides detailed procedures for signaling and operations at a WTRU and source and target eNode-Bs during intra-LTE handover both for successful handover and handover failure cases. In a successful handover case, new information elements (IEs) are added in both the handover command message and the handover complete message. In a handover failure case, new signaling messages are exchanged between a source eNode-B and a target eNode-B.

Figure 1:
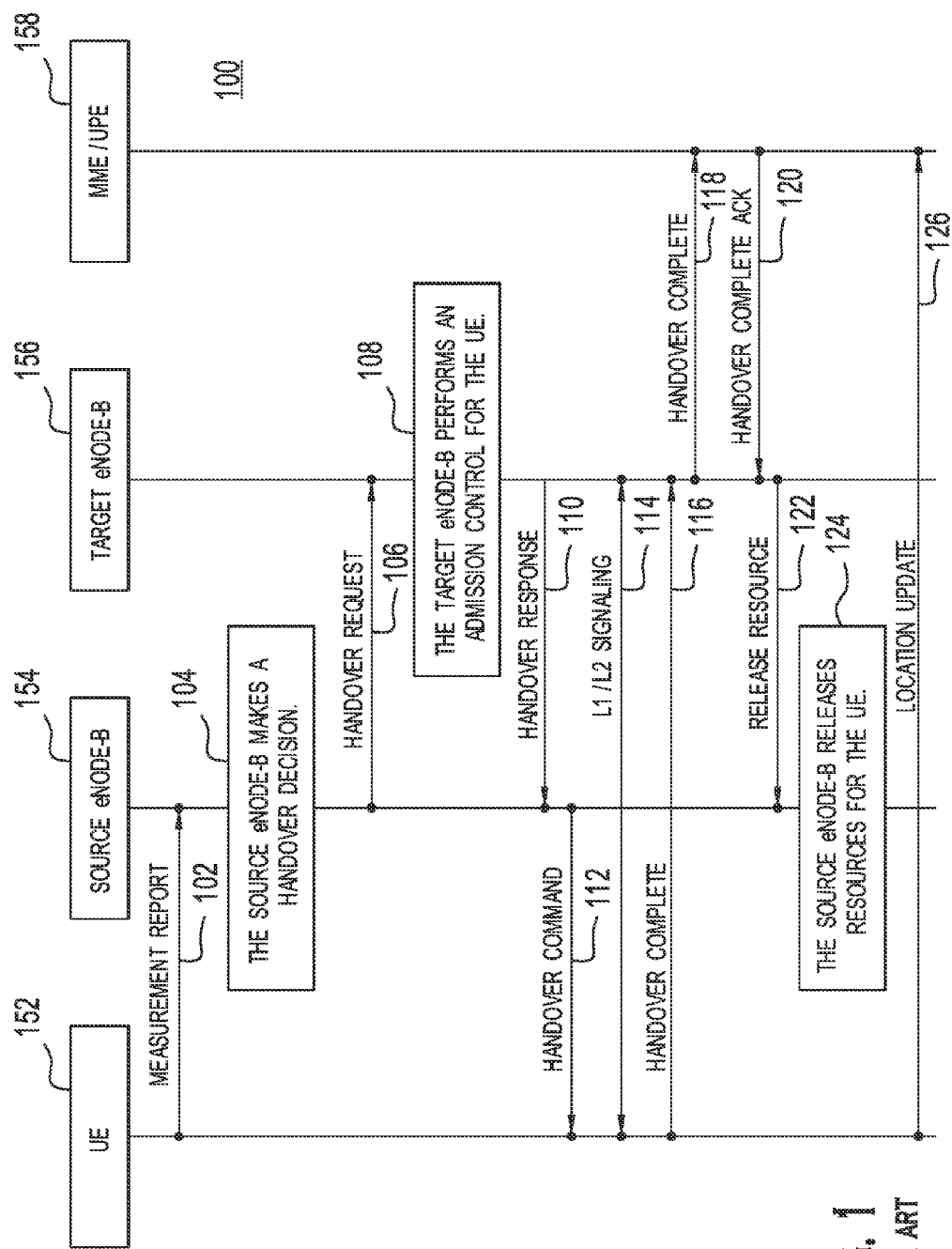
FIG. 1 is a signaling diagram of a handover process currently proposed for the LTE system.
Figure 2:
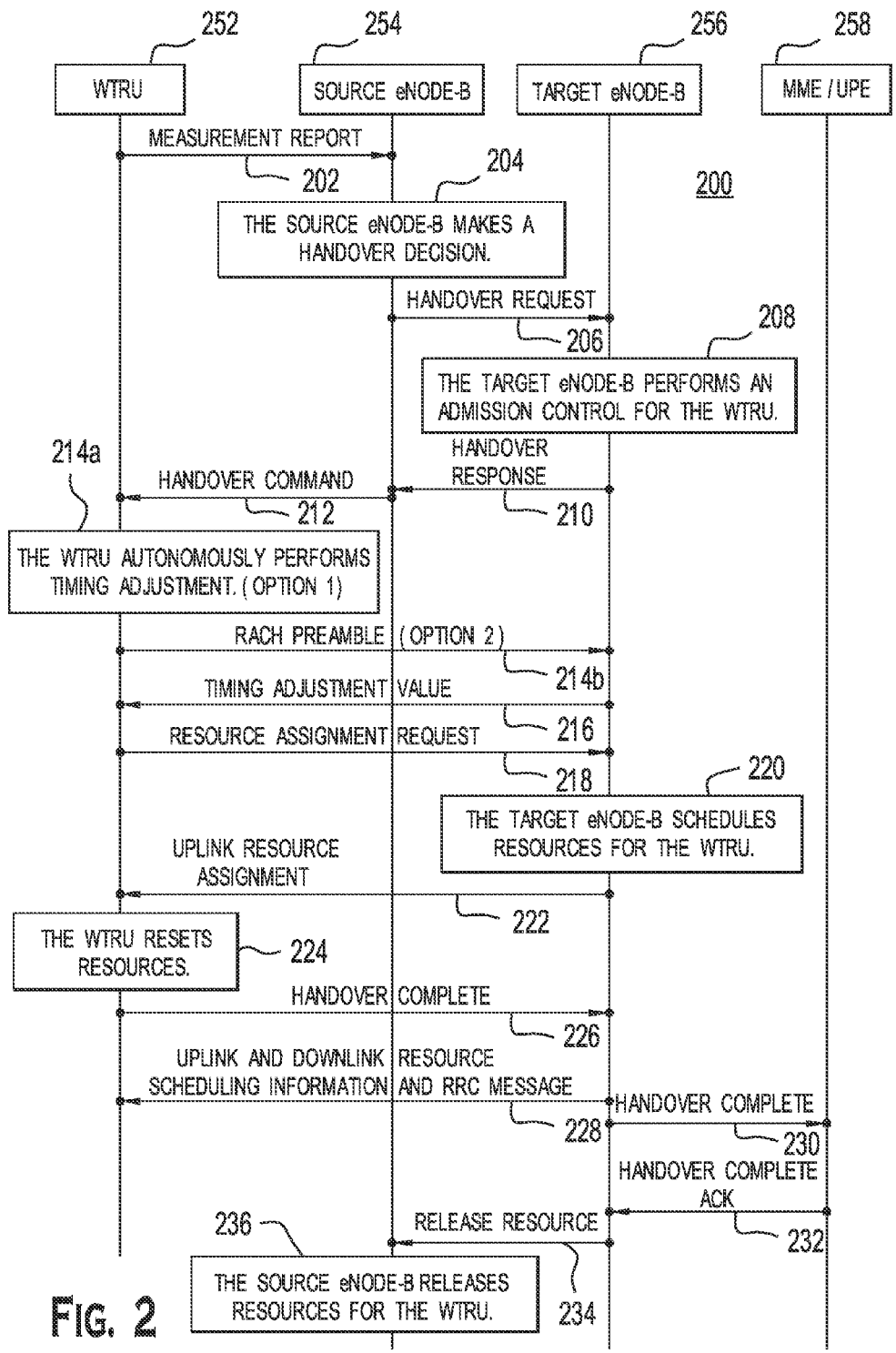
FIG. 2 is a signaling diagram of an intra-LTE handover process in accordance with the present invention.

FIG. 2 is a signaling diagram of an intra-LTE handover process 200 in accordance with the present invention. A WTRU 252 and a source eNode-B 254 each perform at least one measurement, and the WTRU 252 sends a measurement report to the source eNode-B 254 (step 202). The source eNode-B 254 makes a handover decision based on the measurement report and the result of its own measurement (step 204). The source eNode-B 254 then sends a handover request to a target eNode-B 256 (step 206). The target eNode-B 256 performs an admission control for the WTRU 252 (step 208). If the target eNode-B 256 can accept the WTRU 252, the target eNode-B 256 sends a handover response to the source eNode-B 254 indicating that a handover should commence (step 210). The source eNode-B 254 then sends a handover command to the WTRU 252 (step 212).

The handover command should include at least one of reconfiguration information for radio resource control (RRC), radio link control (RLC), medium access control (MAC) and physical (PHY) layer, information regarding timing adjustment when handing over from the source eNode-B 254 to the target eNode-B 256, (i.e., whether the WTRU 252 should perform timing adjustment autonomously or using a random access channel (RACH) procedure, if a RACH is to be used, whether random or dedicated access signature will be used, or the like), relative timing difference between eNode-Bs (or cells) for autonomous timing adjustment, information regarding initial radio resource scheduling procedure at the target eNode-B 256, measurement information for the target eNode-B 256, and the like. The information regarding the initial scheduling procedure at the target eNode-B 256 indicates whether a RACH access procedure should be used for a resource assignment request or the target eNode-B 256 may schedule resources for the WTRU 252 without receiving an explicit resource assignment request from the WTRU 252. Alternatively, the measurement and other configuration information may be sent to the WTRU 252 by the target eNode-B 256 after receiving a handover complete message from the WTRU 252 at step 226.

For a seamless handover, a U-plane tunnel is established between the source eNode-B 254 and the target eNode-B 256. After sending the handover command, the source eNode-B 254 may forward the user data to the target eNode-B 256. The forwarding may take place in a service dependent and implementation specific way.

After receiving the handover command from the source eNode-B 254, the WTRU 252 may continue to transmit and receive data to and from the source eNode-B 254. The data transmission process depends on whether synchronized handover or non-synchronized handover is used.

When a synchronized handover procedure is used, (i.e., the source eNode-B 254 and the target eNode-B 256 are synchronized or the relative timing difference is known to the WTRU 252), the source eNode-B 254 and the WTRU 252 may continue to transmit and receive data after receiving the handover command until a certain handover time ($t_{HO}$) which is signaled via the handover command. The transmitted data after receiving the handover command is preferably limited to incomplete service data units (SDUs), (i.e., RLC protocol data unit (PDU)), transmitted before the handover command was sent. An RLC control message is sent to the WTRU 252 to indicate a sequence number (SN) of a successfully received SDU(s) and an SDU gap. The SN may be a PDCP SN, or other types of SN. An SN common to the successfully received SDU(s) and unsuccessfully received SDU(s) may be included in the RLC control message.

When a non-synchronized handover procedure is used, (i.e., the source eNode-B 254 and the target eNode-B 256 are not synchronized or the relative timing difference is not known to the WTRU 252), the source eNode-B 254 stops transmission as soon as the source eNode-B 254 sends the handover command to the WTRU 252. The WTRU 252 also stops transmission of the data packets to the source eNode-B 254 as soon as the WTRU 252 receives the handover command. Alternatively, the source eNode-B 254 may continue transmission of data packets until the WTRU 252 switches to the target eNode-B 254.

After receiving the handover command, the WTRU 252 accesses the target eNode-B 256 and exchange layer 1/2 (L1/L2) signaling with the target eNode-B 256 to perform downlink synchronization, timing adjustment, (i.e., uplink synchronization), and uplink and downlink resource assignment based on information included in the handover command.

For timing adjustment, (i.e., uplink synchronization), the WTRU 252 implements one of two options. Preferably, the network decides which option to be used.

In accordance with a first option, the WTRU 252 autonomously performs the timing adjustment based on relative timing difference between the source eNode-B 254 (or cell) and the target eNode-B 256 (or cells) (step 214*a*). The relative timing difference information is preferably included in the handover command.

In accordance with a second option, a conventional RACH access procedure is used for the timing adjustment (step 214*b*). The WTRU sends a RACH preamble to the target eNode-B and the target eNode-B calculates timing offset based on the transmitted RACH preamble and sends the timing offset information to the WTRU for uplink synchronization.

A plurality of RACH preamble signatures with different orthogonality and different priority may be used, and among the plurality of RACH preamble signatures, a RACH preamble signature with higher orthogonality, higher priority and/or higher power may be used for the handover purpose.

A particular (dedicated) RACH preamble signature may be reserved for the handover purpose to indicate that the sender is a handover WTRU, (i.e., a WTRU undergoing a handover process). This dedicated RACH preamble signature is indicated in the handover command. After receiving the reserved RACH preamble signature, the target eNode-B 256 recognizes that the sender is a handover WTRU and may provide a priority to the handover WTRU. This can avoid the random access process which causes a long interruption time during handover. Alternatively, a RACH message following the RACH preamble may explicitly indicate that the sender is a handover WTRU. A handover WTRU is preferably given a higher priority to access an eNode-B (cell) than a non-handover WTRU due to state transition. The RACH procedure using the reserved RACH preamble signature may be used in either synchronized or non-synchronized eNode-B (or cell) handover. A physical radio resource allocation for sending the reserved RACH preamble signature to the target eNode-B 256 may also be included in the handover command to reduce a delay for the random access.

The random access procedure may be used for different purposes. The random access procedure may be used to initiate communication between a WTRU and a network which requires a state transit from an LTE_idle state to an LTE_active state. The random access procedure may be used for timing adjustment during handover and then for an access request to the new cell. When the random access procedure is used during handover, the delay caused by the random access procedure should be minimized. Therefore, there should be differences, (e.g., giving a priority to a handover WTRU), between the random access to the target eNode-B (cell) during handover and the random access to the source eNode-B (cell) in a non-handover situation because of state transition from an LTE-Idle state to an LTE-Active state in the non-handover case.

After receiving the RACH preamble signature from the WTRU, the target eNode B estimates the timing adjustment value and sends this value back to the WTRU (step 216).

After performing timing adjustment, (either autonomously or via a RACH preamble transmission), the WTRU 202 may send a radio resource assignment request to the target eNode-B 256 (step 218). The request is preferably sent via a RACH message following the RACH preamble. The target eNode-B 256 then schedules downlink and uplink resources for the WTRU 252 (step 220). Alternatively, the target eNode-B 256 may schedule resources for the WTRU 252 without receiving an explicit request from the WTRU 252. The resource scheduling may take place any time after the target eNode-B 256 admits the WTRU at step 208. For example, for the synchronized handover procedure, the target eNode-B 256 may schedule the uplink and downlink resources after some pre-defined time (earlier than the expected time for eNode-B switching).

The target eNode-B 256 sends an uplink resource assignment to the WTRU 252 (step 222). This uplink resource is used for sending a handover complete message at step 226, not for data transmission. The WTRU 252 preferably resets RLC and HARQ parameters after receiving the uplink resource assignment from the target eNode-B 256 (step 224). Alternatively, the WTRU 252 may reset the RLC and HARQ parameters after receiving and processing the handover command at step 212. These parameters related to transmission to the target eNode-B 256 (or cell) are included in the handover command.

The WTRU 252 sends a handover complete message to the target eNode-B 256 (step 226). The WTRU 252 preferably includes a starting uplink PDCP SN to be transmitted in the handover complete message. Optionally, the WTRU 252 may send an RLC control message to the target eNode-B 256 after the handover complete message to indicate the successfully transmitted SDUs and an SDU gap.

The target eNode-B 256 sends uplink and downlink resource scheduling information for data transmission and an RRC message to the WTRU (step 228). The RRC message includes at least one of radio access bearer (RAB) reconfiguration information, a starting PDCP SN in the downlink, an RLC control message, and measurement related information. Some or all of the above information may optionally be sent as part of the handover command or the first packet from the target eNode-B 256.

The target eNode-B 256 sends a handover complete message to the MME/UPE 258 to inform that the WTRU 252 has gained an access at the target eNode-B 256 (step 230). The MME/UPE 258 then sends a handover complete acknowledgement (ACK) to the target eNode-B 256 and switches the U-plane data path from the source eNode-B 254 to the target eNode-B 256 (step 232). A release of the radio resources at the source eNode-B 254 is triggered by a release resource message sent by the target eNode-B 256 (step 234). After receiving the message from the target eNode-B 256, the source eNode-B 254 releases the radio resources for the WTRU 252 (step 236).

A handover failure case is explained hereinafter by referring to FIG. 2. When the WTRU 252 is not able to handover successfully, the WTRU 252 may resort to a radio link (RL) failure or a cell reselection procedure. If the handover command fails at step 212, the source eNode-B 254 informs the target eNode-B 256 of such a failure. The target eNode-B 256 schedules any uplink and downlink resources to the WTRU 252 after step 208. When performing cell reselection in a handover failure case, the WTRU 252 may first try to access the originally connected cell within the source eNode-B 254.

If this fails, the WTRU 252 may try to access other cells within the source eNode-B. If this also fails, then the WTRU 252 may try to access to other cells not included in the source eNode-B based on the measurement result.

The source eNode-B 254 maintains a timer to time out if the handover complete message is not received after a predetermined time after the handover command failure. The source eNode-B 254 may reset RRC context, PDCP context, RLC and HARQ parameters related to the WTRU 252 if the handover failure timer expires. The source eNode-B then releases the radio resources for the WTRU 252.

When cell reselection is performed by the WTRU 252, the source cell or eNode-B identity (ID) is sent by the WTRU 252 to any eNode-B as part of the LTE-radio network temporary identity (RNTI) information for the detection if the WTRU 252 accesses the original cell or any other cells. At the source eNode-B, the source eNode-B's MAC layer informs its RRC layer of the handover failure if the MAC layer detects failed transmission of handover command.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for recovering from an unsuccessful handover, the method comprising:
a wireless transmit/receive unit (WTRU) receiving a handover command from a source evolved Node-B (eNode-B) associated with a source cell, wherein the handover command indicates that the source eNode-B is directing the WTRU to attempt to perform a handover procedure to move the WTRU from the source cell to a target cell;
the WTRU determining that the handover procedure for moving the WTRU from the source cell to the target cell was unsuccessful; and
the WTRU initiating a radio link failure procedure in response to determining that the handover procedure for moving the WTRU from the source cell to the target cell was unsuccessful, wherein when attempting to access a selected cell after determining that the handover procedure was unsuccessful the WTRU sends an indication of a cell identity (ID) of the source cell from the unsuccessful handover procedure with a radio network temporary identifier (RNTI) assigned to the WTRU to an eNode-B associated with the selected cell.

2. The method of claim 1, wherein the selected cell that the WTRU attempts to access after determining that the handover procedure was unsuccessful comprises the source cell.

3. The method of claim 1, wherein the selected cell that the WTRU attempts to access after determining that the handover procedure was unsuccessful comprises a second cell, and the second cell is also served by the source eNode-B.

4. The method of claim 1, wherein the selected cell that the WTRU attempts to access after determining that the handover procedure was unsuccessful comprises a third cell, the third cell is served by a target eNode-B, and the target eNode-B is a different eNode-B than the source eNode-B.

5. The method of claim 4, wherein the third cell is selected by the WTRU based on a measurement result.

6. The method of claim 1, further comprising:
the WTRU sending a measurement report to the source eNode-B.

7. The method of claim 6, wherein the handover procedure comprises the WTRU sending a handover complete message to a target eNode-B that serves the target cell.

8. The method of claim 1, wherein the RNTI is a RNTI assigned to the WTRU for a Long Term Evolution (LTE) system.

9. A wireless transmit/receive unit (WTRU) comprising:
a transceiver configured to transmit and receive data; and
a controller, coupled to the transceiver, configured to:
receive a handover command from a source evolved Node-B (eNode-B) associated with a source cell, wherein the handover command indicates that the source eNode-B is directing the WTRU to perform a handover procedure to move the WTRU from the source cell to a target cell,
determine that the handover procedure for moving the WTRU from the source cell to the target cell was unsuccessful, and
initiate a radio link failure procedure in response to determining that the handover procedure was unsuccessful, wherein during the radio link failure procedure the WTRU sends an indication of a cell identity (ID) of the source cell from the unsuccessful handover procedure with a radio network temporary identifier (RNTI) assigned to the WTRU to an eNode-B associated with a cell the WTRU is attempting to access.

10. The WTRU of claim 9, wherein the cell that the WTRU is attempting to access upon determining that the handover procedure was unsuccessful comprises the source cell.

11. The WTRU of claim 9, wherein the cell that the WTRU is attempting to access upon determining that the handover procedure was unsuccessful comprises a second cell, and the second cell is also served by the source eNode-B.

12. The WTRU of claim 9, wherein the cell that the WTRU is attempting to access upon determining that the handover procedure was unsuccessful comprises a third cell, and the third cell is served by a different eNode-B than the source eNode-B.

13. The WTRU of claim 12, wherein the controller is configured to select the third cell based on a measurement result.

14. The WTRU of claim 9, wherein the controller is further configured to
send a measurement report to the source eNode-B.

15. The WTRU of claim 14, wherein the controller is further configured to send a handover complete message to a target eNode-B.

16. The WTRU of claim 9, wherein the RNTI is a RNTI assigned to the WTRU for a Long Term Evolution (LTE) system.

17. An evolved Node-B (eNode-B) comprising:
a transceiver configured to transmit and receive data; and
a controller, coupled to the transceiver, configured to:
determine to direct a wireless transmit/receive unit (WTRU) served by the eNode-B to perform a handover procedure,
send a handover command to the WTRU, the handover command instructing the WTRU to handover over from a source cell served by the eNode-B to a target cell, and
receive an indication of a cell identity (ID) of the source cell with a radio network temporary identifier (RNTI) assigned to the WTRU, wherein the cell ID of the source cell with the RNTI assigned to the WTRU is received during a radio link failure procedure initiated by the WTRU in response to the WTRU unsuccessfully attempting the handover from the source cell to the target cell as directed by the handover command.

18. The eNode-B of claim 17, wherein the controller is further configured to inform a target eNode-B of an unsuccessful handover of the WTRU from the source cell to the target cell, and the target cell is associated with the target eNode-B.

19. The eNode-B of claim 17, the controller being further configured to maintain a timer, wherein expiration of the timer prior to receipt of a handover complete message indicates a handover failure.

20. The eNode-B of claim 19, wherein the controller is further configured to reset radio link control (RLC) parameters and hybrid automatic repeat request (HARQ) parameters based on expiration of the timer.

* * * * *